(12) United States Patent
Halim et al.

(10) Patent No.: US 9,862,873 B2
(45) Date of Patent: Jan. 9, 2018

(54) SYSTEM FOR REMOVING ORGANIC DEPOSITS

(71) Applicant: Petroliam Nasional Berhad (Petronas), Kajang, Selangor (MY)

(72) Inventors: Nor Hadhirah Bt Halim, Selangor (MY); Jamal Mohamad Bin Mohamad Ibrahim, Selangor (MY); Siti Rohaida Binti Mohd Shafian, Selangor (MY); Sanjay Misra, Kuala Lumpur (MY); Kulwant Singh, Kuala Lampur (MY)

(73) Assignee: Petroliam Nasional Berhad (Petronas), Kajang, Selangor (MY)

( * ) Notice: Subject to any disclaimer, the term of this patent is extended or adjusted under 35 U.S.C. 154(b) by 0 days.

(21) Appl. No.: 15/228,879

(22) Filed: Aug. 4, 2016

(65) Prior Publication Data

US 2016/0340567 A1    Nov. 24, 2016

Related U.S. Application Data

(62) Division of application No. 13/387,439, filed as application No. PCT/MY2010/000131 on Jul. 26, 2010, now Pat. No. 9,434,871.

(30) Foreign Application Priority Data

Jul. 27, 2009    (MY) .............................. PI 20093108

(51) Int. Cl.
| | | |
|---|---|---|
| *C09K 8/524* | (2006.01) | |
| *E21B 37/06* | (2006.01) | |
| *E21B 36/00* | (2006.01) | |
| *C11D 1/22* | (2006.01) | |
| *C11D 3/18* | (2006.01) | |
| *C11D 3/30* | (2006.01) | |

(52) U.S. Cl.
CPC ................ *C09K 8/524* (2013.01); *C11D 1/22* (2013.01); *C11D 3/18* (2013.01); *C11D 3/30* (2013.01); *E21B 36/006* (2013.01); *E21B 37/06* (2013.01); *C09K 2208/32* (2013.01)

(58) Field of Classification Search
None
See application file for complete search history.

(56) References Cited

U.S. PATENT DOCUMENTS

| | | |
|---|---|---|
| 139,010 A | 11/1873 | Looney |
| 1,806,499 A | 5/1931 | Ranny et al. |
| 2,356,254 A | 8/1944 | Blair, Jr. |

(Continued)

FOREIGN PATENT DOCUMENTS

| | | |
|---|---|---|
| CA | 2115623 | 2/1994 |
| EP | 0121964 | 10/1984 |

(Continued)

OTHER PUBLICATIONS

International Search Report dated Nov. 16, 2010 for PCT Application No. PCT/MY2010/000131.

(Continued)

*Primary Examiner* — John J Figueroa
(74) *Attorney, Agent, or Firm* — Knobbe Martens Olson & Bear LLP

(57) ABSTRACT

A themo-chemical system for removing organic deposits such as wax, asphaltenes, and resins in an oil well borehole, and in oil production and transportation tubing and pathways.

23 Claims, 2 Drawing Sheets

(56) References Cited

U.S. PATENT DOCUMENTS

| | | | |
|---|---|---|---|
| 2,747,672 A | 5/1956 | Simm | |
| 3,279,541 A | 10/1966 | Knox et al. | |
| 3,529,666 A | 9/1970 | Crowe | |
| 3,724,522 A | 4/1973 | Snavely, Jr. | |
| 3,930,539 A | 1/1976 | Curtis | |
| 4,089,703 A | 5/1978 | White | |
| 4,468,339 A | 8/1984 | Rysek | |
| 4,755,230 A | 7/1988 | Ashton et al. | |
| 5,049,311 A | 9/1991 | Rasheed | |
| 5,104,556 A | 4/1992 | Al-Yazdi | |
| 5,891,262 A | 4/1999 | Khalil et al. | |
| 6,003,528 A | 12/1999 | De Souza et al. | |
| 6,234,183 B1 | 5/2001 | Chan et al. | |
| 6,984,614 B1 | 1/2006 | Als | |
| 2004/0058827 A1 | 3/2004 | Jennings | |
| 2007/0062698 A1 | 3/2007 | Smith et al. | |
| 2007/0215347 A1 | 9/2007 | Tang | |
| 2007/0265171 A1 | 11/2007 | Javora | |
| 2008/0020949 A1 | 1/2008 | Trimble | |
| 2008/0067108 A1 | 3/2008 | Sarkar et al. | |
| 2009/0114394 A1 | 5/2009 | Javora | |

FOREIGN PATENT DOCUMENTS

| | | |
|---|---|---|
| GB | 2307497 | 5/1997 |
| MX | PA 02007131 | 12/2002 |
| RU | 2203411 | 4/2003 |
| RU | 2215866 | 11/2003 |
| WO | WO 98/31917 | 7/1998 |
| WO | WO 2007/060544 | 5/2007 |

OTHER PUBLICATIONS

Written Opinion dated Nov. 16, 2010 for PCT Application No. PCT/MY2010/000131.

International Preliminary Report on Patentability dated Jan. 21, 2012 for PCT Application No. PCT/MY2010/000131.

SYSTEM FOR REMOVING ORGANIC DEPOSITS

RELATED APPLICATIONS

This application is a divisional application of U.S. patent application Ser. No. 13/387,439, filed on 13 Apr. 2012, which is a national stage application of International Patent Appl. No. PCT/MY2010/000131, filed on 26 Jul. 2010, which claims priority to Malaysian Patent Appl. No. PI 20093108, filed on 27 Jul. 2009, each of which is incorporated by reference in its entirety.

FIELD OF INVENTION

The present invention relates to a method and a thermochemical system for removing organic deposits such as wax, asphaltenes and resins in oil well borehole, and oil production and transportation tubing and pathway.

BACKGROUND OF THE INVENTION

Crude oil or petroleum is a complex mixture of hydrocarbons of varying molecular weights found in rock formations in the earth. The hydrocarbons present in the crude oil may be classified as aliphatic, alicyclic, aromatic or a mixture of such structures. The hydrocarbon compounds may contain oxygen, nitrogen, sulfur and traces of metals. Some of the lighter hydrocarbons are gaseous at atmospheric conditions. Besides hydrocarbon gases, carbon dioxide, hydrogen sulfide, and some inert gases may also be associated with crude oil.

The hydrocarbon compounds present in the crude oil may undergo many changes during their generation, migration and storage. Some changes are caused by interaction with bacteria and dissolved oxygen present in the flowing aquifer water under the hydrocarbon deposits. Such interaction oxidizes compounds present in the crude to alcohols, aldehydes and acids. Furthermore, the bacterial activity may also generate hydrogen sulfide and sulfur derivatives of hydrocarbons when the reaction conditions become anaerobic.

The compounds present in the crude oil may also be characterized as Saturates, Aromatics, Resins and Asphaltenes (SARA) based on their solubility characteristics in polar and non-polar solvents. Asphaltenes are defined as compounds present in crude oil which are insoluble in n-pentane. Aromatics and resins fractions are although soluble in n-pentane but easily get adsorbed on activated silica gel.

Saturates are the n-pentane soluble fraction which do not get adsorbed in activated silica gel. The difference between aromatics and resins fraction is defined by their elution characteristics from the activated silica gel. Aromatics get easily eluted by toluene from the activated silica get while resins are eluted by using some polar solvent like a mixture of methanol and toluene.

Such a classification of heavy compounds present in crude oil is quite arbitrary. From the chemistry point of view, Asphaltenes are heavy polar compounds having fused benzene ring structure with presence of some alkyl side chain moieties. They may also have some hetroatoms in the moiety such as oxygen, nitrogen and sulfur. The presence of metal ions such as nickel, molybdenum, vanadium, iron, magnesium etc. has been widely reported.

Aromatics are hydrocarbon compounds having 1-3 fused benzene rings with or without 1-2 alkyl side chains. Resins are generally organic acids having linear, alicyclic, aromatic or mixed structure. Saturates are alkanes having linear or branched chain structure. Linear alkanes of carbon number 14-40 are characterized as paraffin waxes and are also termed as macro crystalline waxes. When the carbon number increases from 40, these alkanes are termed as microcrystalline waxes. The maximum carbon number of saturates present in the crude is subject to the method of analysis and detection limit of the instrument but waxes having more than 100 carbon number have been reported.

Heavy compounds are sparingly soluble in crude oil. Asphaltenes are generally not soluble but remain in a colloidal state stabilized by polar compounds such as resins. Thus these heavy compounds remain dissolved or dispersed in crude oil at reservoir temperature and pressure. Such equilibrium is attained over geological times. Production from the reservoir disturbs this equilibrium bringing about separation (precipitation) of heavy compounds. The gases dissolved in crude oil which act as solvent for the heavy compounds start liberating from the crude oil as pressure is decreased. It affects the solubility of compounds like resins which play a vital role in stabilizing asphaltenes colloidal suspension, causing coagulation of asphaltenes. Such coagulated asphaltenes may agglomerate and deposit at rock/metal surface causing numerous problems.

Wax deposition in petroleum industry is a widely recognized problem. Wax deposition takes place as a result of a change of solubility equilibrium either due to a decrease in temperature or loss of light ends (gases dissolved in crude oil) at lower pressures. In such a situation, wax crystallizes out and tends to deposit at any surface like rock or metal. Heavy waxes (microcrystalline) precipitate first in order of their molecular weight.

Deposition is a dynamic process which is governed by diffusion of wax crystal (by Brownian motion) to substrate surface, cohesive forces between wax crystals and adhesive forces between wax crystals and substrate. Gravity settling of separated wax crystals may also contribute to some extent. The force of flow (shear force) opposes deposition and chips off deposited wax crystals.

Over a period of time, the nature of deposit changes and acquires a more thermodynamically stable form. Such stable form increases the melting point of deposits 10-15° C. more than the temperature of deposition environment. Thus any attempt to remove the deposit may not be successful if the temperature during treatment is not increased by 10-15° C. above deposition environment.

Rocks are initially water-wet i.e. their surface offers attraction to polar molecules like water and allow the easy movement of oil. Organic deposition particularly asphaltenes deposition on the rock surface changes the nature of such wettability to oil-wet. Once the rocks become oil-wet, they offer resistance to the flow of oil through its pore space. Thus it not only physically blocks rock pores (formation pores, formation pore throats) but also changes the wettability causing increased resistance to flow of oil thereby reducing productivity of oil wells.

The change in wettability increases the resistance to flow of oil, thus water is allowed to move more freely through rock spaces. This phenomenon is termed as change in relative permeability of water. When relative permeability of water in a rock formation increases with respect to oil and pressure differential across the rock faces is high, water coning may occur. Water coning may indicate a false water breakthrough.

Wettability of the rock can only be restored by removal of deposition and cleaning of the surface of deposited organic species.

Solid deposition may occur at borehole (wellbore formation), production tubing, flow lines or pipe lines. Deposition of organic solids. is very detrimental to production efficiency of the well if it happens in and around borehole (wellbore formation). This adverse effect on production is known as formation damage or development of skin or borehole damage.

An oil well is constructed by drilling a hole in the earth surface. After drilling each section of the well, a metallic pipe is lowered and cemented in the well. Such a pipe is called a casing. The last such casing lowered and cemented in the well serves the purpose of isolating the oil bearing rocks and is known as production casing. The oil flow in the casing is accomplished by perforating the casing at appropriate intervals. Sometimes the oil bearing rock is left uncased. Such a well construction is termed as bare foot completion. Another metallic pipe is lowered in the well which is called production tubing through which oil flows to the surface. The space between production casing and production tubing is called as annulus. Production tubing is sometimes isolated from the annulus by means of a packer. Sometimes another tube is also lowered inside the tubing (macaroni tube) to facilitate treatment of the producing fluid or other well interventions. Access to the annulus, production tubing and macaroni is provided by placement of suitable opening and valves contained at the surface in the Christmas tree.

The following methods may be applied to remove deposition of heavy organic compounds in the well bore, production tubing and production system.

1. Hot oiling, hot water circulation, steam squeeze or circulation—Temperature of deposition environment is raised to dissolve wax
2. Solvent squeeze—uses better solubility of solvents to waxes
3. Surfactant squeeze—uses dispersive property of surfactants The above methods may be effective to a certain extent. However, the repetitive use of these methods tends to diminish their effectiveness since the deposits get tougher and tougher as a result of the accumulation of higher molecular weight species.

Thermo-chemical formulations may involve the use of acids and bases or redox pairs. The present invention utilizes the heat generated from the exothermic reaction between acids and bases to remove organic deposits.

Inorganic acids like sulfuric acid, hydrochloric acid and bases like sodium hydroxide, potassium hydroxide have been used in aqueous solutions. Some times, such acids and bases have been used as suspension or emulsion in organic solvents.

U.S. Pat. No. 6,234,183 B1 discloses a method and composition for removing deposits of heavy hydro carbonaceous materials and finely divided inorganic particulate matter from wellbore and flowline surfaces using a composition containing an alkyl polyglycoside, an ethoxylated alcohol, a caustic and an alkyl alcohol.

United States Patent publication No. US 2004/0058827 A1 discloses paraffin inhibitors prepared by admixing a polymer having the characteristic of inhibiting paraffin crystalline growth in formation fluid from oil and gas wells with a first solvent selected from the weak to moderate wax solvents and a second solvent selected from the strong wax solvents. Examples of weak to moderate wax solvents include benzene, toluene, xylene, ethyl benzene, propyl benzene, trim ethyl benzene and mixtures thereof. Examples of strong wax solvents include cyclopentane, cyclohexane, carbon disulfide, decalin and mixtures thereof. The solvent system disclosed has desirably better solubility with polymers, even at reduced temperatures, than either solvent alone.

United States Patent publication No. U.S. Pat. No. 6,003,528, WIPO publication number WO 9831917, British Patent Publication number GB2307497 and Canadian Patent Publication number CA2115623 describe a thermo-chemical system for removal of wax deposits by generation of heat and nitrogen using two aqueous solutions of oxidizing and reducing nitrogen salts respectively. These aqueous solutions are emulsified into a non-polar solvent such as kerosene. Upon mixing the two emulsions, nitrogen and a mild amount of heat is generate. Redox reaction can be delayed by certain additives.

Russian Patent Publication RU 2203411 describes emulsion of aqueous solutions of ammonium nitrite and ammonium sulphite in organic solvent. The two emulsions generate heat upon mixing which helps the removal of wax deposits.

Russian Patent Publication number RU 2215866 describes the mixing of aqueous solutions of sulfamic acids and aqua ammonia to generate heat which helps the removal of organic deposits.

WIPO Publication number WO 2007060544 describes the mixing of aqueous solutions of sodium hydroxide and acetic acid to generate heat which is used for the removal of organic deposits.

Publication number MXPA 02007131 describes the esterification reaction between two solutions of polyhydric alcohol and carboxylic acid as a source of heat for the removal of organic deposits.

However, the abovementioned prior art does not provide a satisfactory solution as most of them involve the use of aqueous solutions, which are not very effective as components of organic deposits are not water soluble. Treatment with aqueous formulations presents emulsion and disposal problems.

BRIEF DESCRIPTION OF THE DRAWINGS

The present invention will be described by way of example only, with reference to the accompanying drawings in which.

DETAILED DESCRIPTION OF INVENTION

Figures 1A, 1B:
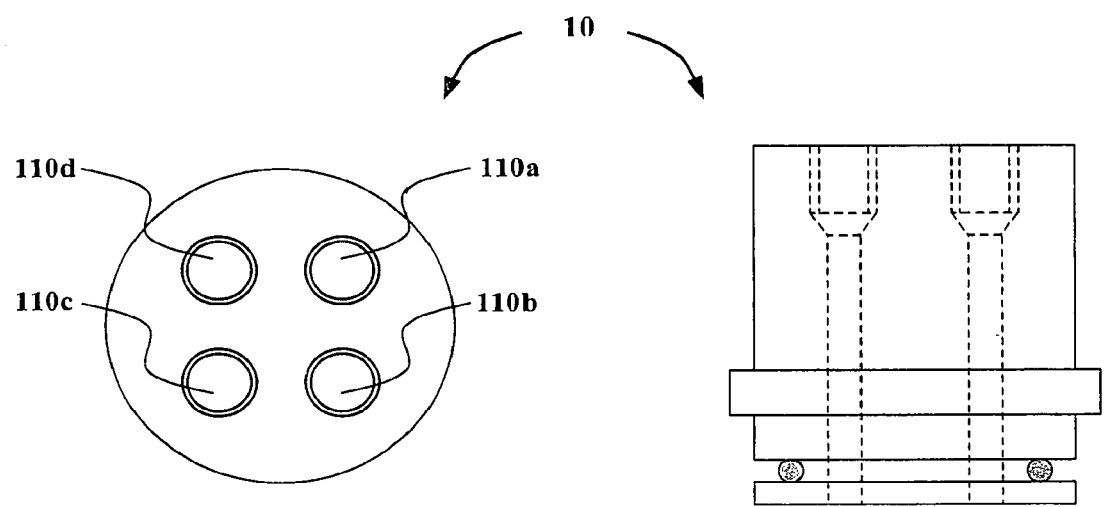
FIG. 1a shows a top view.
FIG. 1b shows a side view of a connector according to an embodiment of the present invention.

The present invention provides a solution to organic deposit problems in oil well bore, and oil production and transportation tubing and pathway in the form of a fluid formulation or combination of formulations, which can generate sufficient heat and have the capability of dissolving and dispersing the organic deposits in a way that they remain in solution/suspension to prevent their re-deposition and are easily removed. The present invention uses organic formulations which have a higher solubility for organic deposits without any adverse effect on the oil well production system and process.

The present invention uses a combination of the action of heat, solvents and surfactants to remove organic deposits more effectively and has the following features:
1. The system is organic in nature;
2. The system is capable of generating sufficient heat to facilitate the dissolution and dispersion of organic deposits;
3. The reaction products should provide stable suspension at lower process temperature; and
4. The system can be adapted to tackle the different types of organic deposits.

Linear alkyl benzene sulfonic acids (LABSA), also termed as linear alkyl aryl sulfonic acids are used in the formulations. LABSA are industrially produced and are available in a variety of mixtures denoted by average carbon number of the alkyl side chains. Thus LABSA having 4, 8, 12, 16 and 18 average carbon numbers in the alkyl side chains are easily available. Of these LABSA having 4, 8, and 12 carbon number side chains were found to be suitable.

Aliphatic acids such as formic, acetic and propanoic acid were also examined for the purpose and found suitable.

Organic bases such as alkyl amines, ethylene amines and poly amines were found to be more suitable for the purpose.

Amines react exothermally with various LABSA or aliphatic acids producing imides and heat. Such reaction should not be per se considered an acid base reaction as these compounds are acidic or basic with respect to aqueous solution. Reaction of these compounds in an aqueous medium would produce ammonium or quaternary ammonium salts. But the chemical reaction in organic solvents gives very different results.

The present invention is a thermo-chemical system using at least two formulations. One formulation is a solution of LABSA or aliphatic acids in organic solvents while the other is a solution of amines in organic solvents. Some additives such as corrosion inhibitors and surfactants may be added to make the formulations more suitable for application.

Organic solvents such as toluene, xylene, heavy aromatic solvents, diesel, naphtha, petroleum distillates and mixtures thereof may be used.

A formulation in one part may contain LABSA or aliphatic acids or a mixture thereof in the above solvents with suitable additives like corrosion inhibitors or surfactants.

The concentration of LABSA and aliphatic acids or their mixtures can be 1-90% in abovementioned solvents. More appropriately, the concentration of LABSA or aliphatic acids or their mixture thereof can be 40-95%. More specifically the concentration of LABSA and aliphatic acid or mixture thereof can be 50-80%.

The LABSA used in abovementioned formulation can be those containing 4, 8 or 12 carbon numbers in the aliphatic side chain.

Aliphatic acids used in the above solvents can be formic, acetic or propanoic acids. More specifically, the aliphatic acid used in above formulation can be acetic acid.

The second formulation on the other hand may contain aliphatic amines, ethylenediamine or polyamines or their mixture thereof in abovementioned solvents in the concentration of 1-95%. More appropriately, the concentration of aliphatic amines, ethylendiamine, polyamines or mixture thereof in above mentioned solvents can be 40-95%. Specifically the concentration of apliphatic amines, ethylendiamine, polyamines or mixture thereof in above mentioned solvents can be 50-80%.

The solvents used in this formulation can be, more appropriately xylene, heavy aromatic solvents, diesel and light naphtha.

In one aspect of the invention, the two formulations can be simultaneously injected into the well inside the tubing generally called bullheading so that the mixture and the heat generated in the process are carried to the part of the well affected with organic deposition.

In another aspect of the invention, the two formulations can also be simultaneously injected in the well inside the flow line or pipeline so that the mixture and the heat generated in the process are carried to the part of the well, flow line or pipeline affected with organic deposition.

In the wells where there is communication between lower part of the production tubing and annulus, one formulation can be injected in the production tubing and the other in the annulus in a manner that their mixing takes place at the bottom of the production tubing. The exothermic reaction between the two formulations generating heat can be further carried to the down stream part of the well where organic deposition has taken place.

In the wells where another tube is provided inside the production tubing, one formulation can be injected in the tube and the other in the annulus between the production tubing and such tube in a manner that their mixing takes place at the bottom of the tube. The exothermic reaction of the mixture would generate heat which can be further carried to the down stream part of the well where organic deposition has taken place.

In many oil wells, intervention equipment known as coil tubing unit (CTU) is used. The use of CTU allows insertion of coil tube inside the production tubing. In such an arrangement, one formulation can be injected in the coil tube and the other in the annulus between the production tubing and coil tube in a manner that their mixing takes place at the bottom of the coil tube. The resultant mixture which by virtue of exothermic reaction would generate heat which can be further carried to the down stream part of the well where organic deposition has taken place.

To generate a higher temperature, one or both formulations can be heated prior to their injections.

The injection of formulations as described above may be preceded by an organic solvent formulation called pre-flush, which helps prepare the deposit surface to interact more readily with the formulations.

After simultaneous injections of the two formulations as described above, a fluid is injected into the well to carry the resultant mixture to the affected parts where solid deposition has taken place. Such a fluid is called as post-flush.

After directing the resultant mixture to the targeted location by injection of post flush—in calculated volumes, the resultant mixture is allowed to soak where the deposits are located for 12-24 hrs. After the soaking period, the normal production from the well or in the line may be resumed. The dissolved and dispersed organic deposits are carried away leaving the affected parts cleared of the organic deposits.

The usual offshore oil production platforms are not large enough to accommodate big equipment like high capacity pumps and solution tanks, which are normally used to carry out such job. Therefore, the jobs are carried out with the help of a barge. On the other hand crane capacities at the offshore platforms are often limited. Present invention includes design of the equipment to overcome these handicaps.

Multiple small pumps of 500-1500 lit/hr pumping capacity each may be used to pump the two formulations. The pumps are connected to the solution tanks separately. Any of the pump-solution tank sets can be used for injection of one of the formulations. Two or more such sets are dedicated to injection of one formulation. If one pump does not function, the application can be carried out with the remaining pump or pumps. Such a provision is necessary because the injection of the formulation should be accomplished without stoppage of the work and within the stipulated time. The pumps are chosen in such a way that their weight does not exceed more than the lifting capacity of the platform crane. The electric power can be supplied from the generators available at the platform or portable generators can be carried on to the platform.

Figure 2:
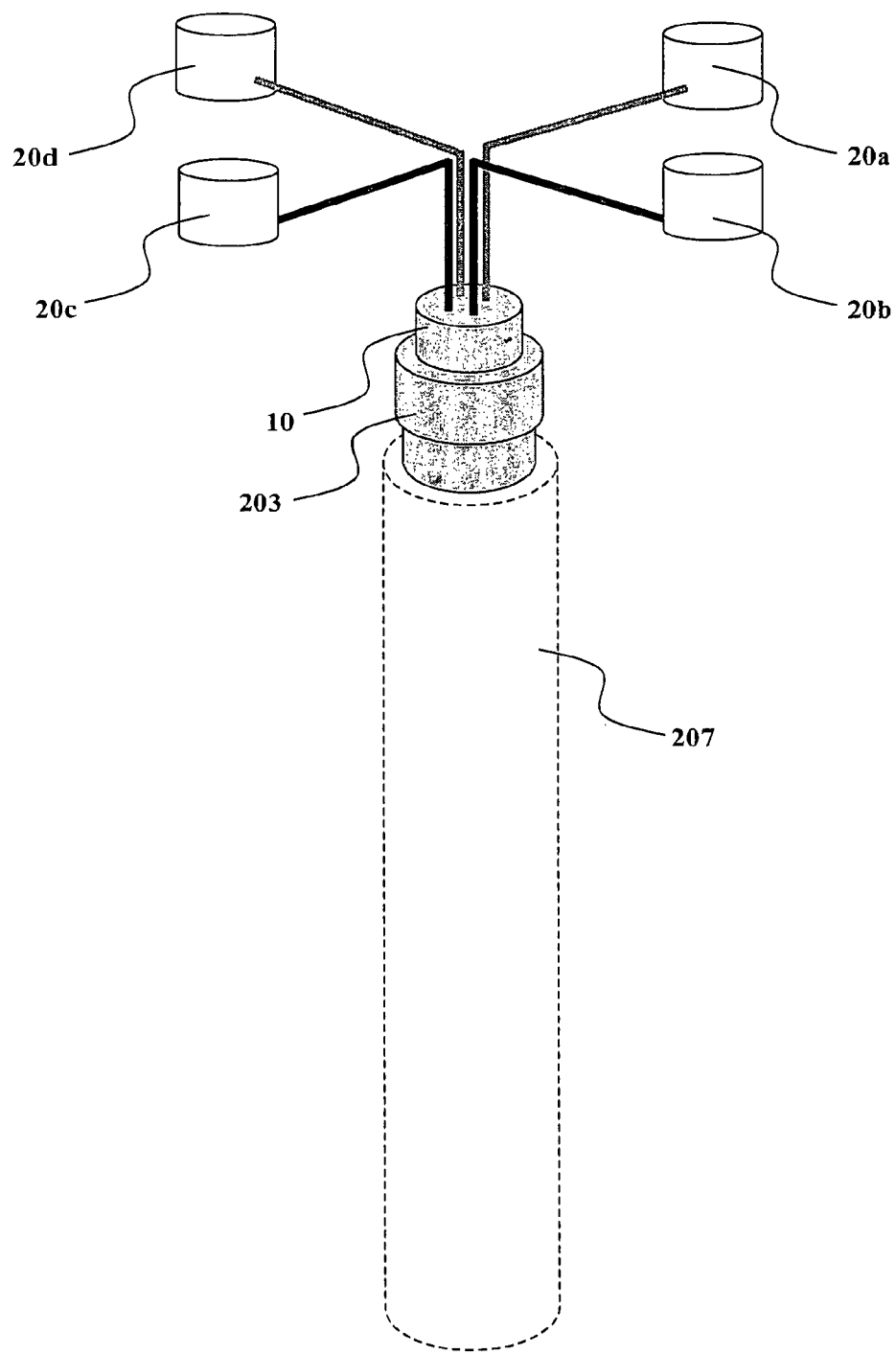
FIG. 2 shows an arrangement of pumps and solution tanks according to an embodiment of the present invention.

All the pumps can be connected to the production tubing (203), annulus, flow line or pipeline with the help of ½ to ¾ inch size stainless steel tubes through a specially designed steel connector (10) having multiple holes (110a, 110b, 110c, 110d) as shown in FIG. 1a. As shown in FIG. 2, uses of such a connector (10) allows the use of separate sets of pumps solution tanks (20a, 20b, 20c, 20d) independently and use of small size stainless steel tubes which cause appreciable reduction in weight and size of equipment particularly hoses used in such application.

While the present invention is directed primarily to the removal of organic deposits such as wax, asphaltenes and resins in oil well (207) borehole, and oil production and transportation tubing and pathway, the method and composition of the present invention can be used wherever there is a problem with the formation of organic deposits.

EXAMPLES

The following examples are used to illustrate the present invention.

Example 1

The organic deposits obtained from a well have the following characteristics:

| Sr No. | Test Sample Description | Test Method | Unit | Results |
|---|---|---|---|---|
| 1 | Physical appearance | Visual | — | Black brown colored solid |
| 2 | Loss on heating at 100° C. | — | % wt | NA |
| 3 | Melting Point | ASTM D127 | ° C. | 79 |
| 4 | n-pentane Insolubles | ASTM 2007 modified | % wt. | 51.01 |
| 5 | Saturates content | ASTM 2007 modified | % wt. | 29.16 |
| 6 | Aromatics content | ASTM 2007 modified | % wt. | 6.01 |
| 7 | Resins content | ASTM 2007 modified | % wt. | 14.70 |

A thermo-chemical system comprising of two formulations is designed for the above deposits. The first formulation contains 60% LABSA having 12 average carbon numbers in the alkyl side chain is dissolved in heavy aromatic solvent while the second formulation contains 60% n-butylamine in heavy aromatic solvent. 100 ml of first formulation and 50 ml of second formulation are poured into a 250 ml beaker containing 5 g of deposit. The resultant mixture is gently stirred and the maximum temperature generated during the reaction is measured to be around 90° C. It is observed that the deposits are easily dissolved and dispersed in the resultant mixture. The resultant mixture is allowed to cool at 40° C. It is observed that the deposits remain in the suspension at 40° C. No separation of wax is observed.

Example 2

Organic deposits obtained from a well have the following characteristics:

| Sr No. | Test Sample Description | Test Method | Unit | Results |
|---|---|---|---|---|
| 1 | Physical appearance | Visual | — | Brown colored solid |
| 2 | Loss on heating at 100° C. | — | % wt | 13.23 |
| 3 | Melting Point | ASTM D127 | ° C. | 88 |
| 4 | n-pentane Insolubles | ASTM 2007 modified | % wt. | 39.21 |
| 5 | Saturates content | ASTM 2007 modified | % wt. | 42.68 |
| 6 | Aromatics content | ASTM 2007 modified | % wt. | 2.76 |
| 7 | Resins content | ASTM 2007 modified | % wt. | 2.20 |

A thermo-chemical system comprising of two formulations is designed for above deposits. The first formulation contains 80% LABSA having 12 average carbon numbers in the alkyl side chain is dissolved in heavy aromatic solvent while the second formulation contains 80% n-butyl amine in heavy aromatic solvent. 100 ml of first formulation and 50 ml of second formulation is poured into a 250 ml beaker containing 5 g of deposit. The resultant mixture is gently stirred and the maximum temperature generated during the reaction is measured to be 115° C. It is observed that the deposits are easily dissolved and dispersed in the resultant mixture. The resultant mixture is allowed to cool at 40° C. It is observed that the deposits remain in the suspension at 40° C. No separation of wax is observed.

Example 3

Organic deposits obtained from a well have the following characteristics:

| Sr No. | Test Sample Description | Test Method | Unit | Results |
|---|---|---|---|---|
| 1 | Physical appearance | Visual | — | Pale brown colored solid |
| 2 | Loss on heating at 100° C. | — | % wt | 11.17 |
| 3 | Melting Point | ASTM D127 | ° C. | 94 |
| 4 | n-pentane Insolubles | ASTM 2007 modified | % wt. | 71.29 |
| 5 | Saturates content | ASTM 2007 modified | % wt. | 5.60 |
| 6 | Aromatics content | ASTM 2007 modified | % wt. | 1.42 |
| 7 | Resins content | ASTM 2007 modified | % wt. | 1.75 |

A thermo-chemical system comprising of two formulations is designed for the above deposits. The first formulation contains 10% LABSA having. 12 average carbon numbers in the alkyl side chain and 60% acetic acid is dissolved in heavy aromatic solvent while the second formulation contains 70% n-butyl amine in heavy aromatic solvent. 40 ml of first formulation and 60 ml of second formulation are poured into a 250 ml beaker containing 5 g of deposit. The resultant mixture is gently stirred and the maximum temperature generated during the reaction is measured to be 125° C. It is observed that the deposit are easily dissolved and dispersed in the resultant mixture. The resultant mixture is allowed to cool at 40° C. It was observed that the deposits remain in the suspension at 40° C. No separation of wax is observed.

While the invention has been described m connection with certain preferred embodiments illustrated above, it will be understood that it is not intended to limit the invention to these particular embodiments. On contrary, it is intended to cover all alternatives, modifications and equivalents as may be included within the scope of the invention as defined by the appended claims.

What is claimed is:

1. A system for treating or removing organic deposits formed oil well boreholes, oil production and transportation tubing, and pathway systems, the system comprising:
   a first tank containing a first heavy aromatic naphtha based solution comprising LABSA or aliphatic acids or mixtures of both;
   a second tank containing a second heavy aromatic naphtha based solution comprising amines;
   a first pump in fluid communication with the first tank; and
   a second pump in fluid communication with the second tank, the first and second pumps configured to inject the first and second solutions into a pathway having organic deposits disposed therein such that the first and second solutions react to produce imides and heat to remove the organic deposits.

2. The system of claim 1, wherein the first solution includes LABSA in a suitable solvent with or without additives such as corrosion inhibitors or surfactants.

3. The system of claim 2, wherein the LABSA component has four, eight, or twelve average carbon number in the alkyl side chain or mixture thereof.

4. The system of claim 2, wherein the suitable solvent is an organic solvent such as toluene, xylene, heavy aromatic solvents, diesel, naphtha, petroleum distillates or mixtures thereof.

5. The system of claim 1, wherein the first solution includes aliphatic acids such as formic, acetic and propanoic acids in a suitable solvent.

6. The system of claim 1, wherein the first solution includes acetic acid in a suitable solvent.

7. The system of claim 1, wherein the first solution is a mixture of LABSA and aliphatic acid such as formic, acetic or propanoic acid in suitable solvent.

8. The system of claim 1, wherein the first solution includes a mixture of LABSA and acetic acid in a suitable solvent.

9. The system of claim 1, wherein the second solution includes organic bases such as alkyl amines, ethylene amines and poly amines in a suitable solvent.

10. The system of claim 9, wherein the concentration of apliphatic amines, ethylendiamine, polyamines or mixture thereof is 50-80%.

11. The system of claim 1, wherein the second solution includes aliphatic amines such as ethyl, propyl, butyl, pentyl amine or mixture thereof in a suitable solvent.

12. The system of claim 1, wherein the second solution includes butyl amine amines in a suitable solvent.

13. The system of claim 1, wherein the concentration of LABSA and aliphatic acid or mixture thereof is 50-80%.

14. The system of claim 1, wherein the pathway includes bullheading tubing and the pumps are configured to inject the first and second solution into the bullheading tubing more or less at the same time.

15. The system of claim 1, wherein the pathway is selected from the group consisting of an oil production pathway, an oil transportation pathway, an oil transportation tube, an oil flow line, and an oil pipeline, and wherein the pumps are configured to inject the first and second solution into the pathway more or less at the same time.

16. The system of claim 1, wherein the pathway includes an oil well having at least production tubing and an annulus, wherein one of the first or second pump is in fluid communication with a lower part of the production tubing and the other of the first or second pump is in fluid communication with the annulus, such that the mixing of the first and second solution takes place at the lower part of the production tubing and the mixture together with the heat generated may be carried further down the well to where the organic deposits are located.

17. The system of claim 1, wherein the pathway includes an oil well having at least production tubing, an annulus, and a tube provided inside the production tubing, and wherein one of the first or second pump is in fluid communication with the tube and the other of the first or second pump is in fluid communication with the annulus such that mixing takes place at the bottom portion of the tube and the mixture together with the heat generated may be carried further down the well to where the organic deposits are located.

18. The system of claim 1, wherein the pathway includes an oil well having at least production tubing, an annulus, and a coil tubing unit ("CTU") positioned within the production tubing, wherein one of the first or second pump is in fluid communication with the CTU and the other of the first or second pump is in fluid communication with the annulus such that the mixing takes place at a bottom portion of the CTU and the mixture together with the heat generated may be carried further down the well to where the organic deposits are located.

19. The system of claim 1, further comprising one or more heaters configured to heat the first and second solutions prior to their injection.

20. The system of claim 1, further comprising a third tank containing an organic solvent formulation called a pre-flush and a third pump in fluid communication with the third tank and configured to inject the pre-flush into the pathway.

21. The system of claim 1, further comprising a fourth tank containing a post-flush and a fourth pump in fluid communication with the fourth tank and configured to inject the post-flush into the pathway.

22. The system of claim 1, wherein the first and second pumps are capable of injecting at a rate of 1000-2000 lit/hr.

23. The system of claim 1, further comprising a connector capable of coupling to a well, the connector having at least a first hole and a second hole passing therethrough, and further comprising a first tube coupled to the first pump and disposed through the first hole in the connector and a second tube coupled to the second pump and disposed through the second hole in the connector.

* * * * *